US012773934B2

(12) United States Patent
Runde et al.

(10) Patent No.: US 12,773,934 B2
(45) Date of Patent: Oct. 27, 2026

(54) VEHICLE SEAT HAVING A CUSHION WITH A STADIUM POSITION

(71) Applicant: MAGNA SEATING INC., Aurora (CA)

(72) Inventors: David M. Runde, Ortonville, MI (US); Damian Runkle, West Bloomfield, MI (US); Kai Zhao, Novi, MI (US); Kristof M. Kurzeja, Commerce Township, MI (US)

(73) Assignee: MAGNA SEATING INC., Aurora (CA)

( * ) Notice: Subject to any disclaimer, the term of this patent is extended or adjusted under 35 U.S.C. 154(b) by 132 days.

(21) Appl. No.: 18/872,734

(22) PCT Filed: Jul. 6, 2023

(86) PCT No.: PCT/US2023/026968
§ 371 (c)(1),
(2) Date: Dec. 6, 2024

(87) PCT Pub. No.: WO2024/010836
PCT Pub. Date: Jan. 11, 2024

(65) Prior Publication Data

US 2026/0249755 A1 Aug. 27, 2026

Related U.S. Application Data

(60) Provisional application No. 63/358,672, filed on Jul. 6, 2022.

(51) Int. Cl.
*B60N 2/30* (2006.01)
*B60N 2/02* (2006.01)

(52) U.S. Cl.
CPC ....... *B60N 2/3065* (2013.01); *B60N 2/02253* (2023.08); *B60N 2/02258* (2023.08);
(Continued)

(58) Field of Classification Search
CPC .......... B60N 2/3065; B60N 2002/0212; B60N 2002/022; B60N 2/3045; B60N 2/3047; B60N 2/305; A47C 1/121
See application file for complete search history.

(56) References Cited

U.S. PATENT DOCUMENTS 3,850,476 A 11/1974 Day
3,973,799 A * 8/1976 Berg ........................ B60N 2/06 296/65.09
(Continued)

FOREIGN PATENT DOCUMENTS

CN 113232565 B 3/2022
CN 113306467 B 8/2022
(Continued)

*Primary Examiner* — Joshua J Michener
*Assistant Examiner* — Nevena Aleksic
(74) *Attorney, Agent, or Firm* — Miller Canfield

(57) ABSTRACT

A vehicle seat for an automotive vehicle has laterally spaced apart side members with respective pivot slots and a cushion frame supported between the side members and including laterally spaced apart sliding slots. The vehicle seat has opposing front attachments fixedly coupled to the respective side members and pivotably and slidably coupled to the respective sliding slots. The vehicle seat also includes opposing rear attachments coupling the cushion frame to the respective pivot slots. The cushion frame is repositionable between a horizontal seating position and an upright stadium position. To reposition the cushion frame from the seating position to the stadium position, the cushion frame is translated forwardly along the pivot slots prior to pivoting the cushion frame about the front attachments to the stadium position.

21 Claims, 13 Drawing Sheets

(52) U.S. Cl.
CPC .... *B60N 2/3093* (2013.01); *B60N 2002/0212* (2013.01); *B60N 2002/022* (2013.01)

(56) References Cited

U.S. PATENT DOCUMENTS

| | | | | |
|---|---|---|---|---|
| 5,195,802 | A | 3/1993 | Hayakawa et al. | |
| 5,320,411 | A | 6/1994 | Sera | |
| 5,454,624 | A * | 10/1995 | Anglade | B60N 2/0292 297/378.12 |
| 7,374,242 | B2 | 5/2008 | Champ et al. | |
| 7,469,861 | B2 * | 12/2008 | Ferry | B60N 2/3065 244/118.6 |
| 7,703,851 | B2 * | 4/2010 | Nakaya | B60N 2/34 297/344.15 |
| 8,376,442 | B1 | 2/2013 | Brantley | |
| 9,102,250 | B2 * | 8/2015 | Seibold | B60N 2/3065 |
| 10,266,075 | B2 * | 4/2019 | Dlugokecki | B60N 2/10 |
| 10,549,670 | B1 * | 2/2020 | Smith | B60N 2/938 |
| 10,807,504 | B2 | 10/2020 | Line et al. | |
| 10,843,599 | B2 * | 11/2020 | Arico | B60N 2/3093 |
| 10,946,776 | B2 | 3/2021 | Kish et al. | |
| 11,214,178 | B2 | 1/2022 | Line et al. | |
| 11,214,179 | B2 | 1/2022 | Line et al. | |
| 11,279,262 | B2 | 3/2022 | Line et al. | |
| 11,390,190 | B2 * | 7/2022 | Bouzid | B60N 2/919 |
| 2005/0006940 | A1 * | 1/2005 | Yoshida | B60N 2/3047 297/378.12 |
| 2021/0101508 | A1 | 4/2021 | Wang | |
| 2025/0074266 | A1 * | 3/2025 | Epaud | B60N 2/06 |

FOREIGN PATENT DOCUMENTS

| | | |
|---|---|---|
| DE | 10025605 | 9/2001 |
| KR | 1956985 B1 | 3/2019 |

* cited by examiner

VEHICLE SEAT HAVING A CUSHION WITH A STADIUM POSITION

CROSS-REFERENCE TO RELATED APPLICATIONS

This application claims priority to U.S. Provisional Application 63/358,672, filed on Jul. 6, 2022, the disclosure of which is hereby incorporated by reference in its entirety.

FIELD AND BACKGROUND OF THE INVENTION

The present invention relates to a vehicle seat for use in an automotive vehicle. More particularly, the invention relates to a flip-up mechanism for use on a vehicle seat having a cushion frame and configured to allow rotation of the cushion frame between a seating position and a stadium position.

DESCRIPTION OF RELATED ART

Automotive vehicles typically include one or more vehicle seats having a cushion frame and a back frame for supporting a passenger above a vehicle floor. It is commonly known for the cushion frames of certain vehicle seats to be pivotable between a seating position and a stadium position. It is also commonly known for certain vehicle seats to include a flip-up mechanism operatively coupled between the cushion frame and side members and configured to allow rotation of the cushion frame between the seating position and the stadium position.

However, currently known vehicle seats require the occupant to manually rotate the cushion frame between the seating position and the stadium position.

It is desirable, therefore, to provide a vehicle seat having a flip-up mechanism which automatically rotates the cushion frame between the seating position and the stadium position without requiring the occupant to manually rotate the cushion frame. In addition, it is desirable for the flip-up mechanism to translate the cushion frame forward prior to rotating the cushion frame upward to accommodate a seat cushion placed on the cushion frame.

SUMMARY OF THE INVENTION

According to one embodiment, there is provided a vehicle seat for an automotive vehicle. The vehicle seat comprises laterally spaced apart side members having respective pivot slots. The vehicle seat also comprises a cushion frame supported between the side members and including laterally spaced apart cushion side members having respective sliding slots. The cushion frame is repositionable between a seating position and a stadium position. The vehicle seat also includes opposing front attachments fixedly coupled to the respective side members and pivotably and slidably coupled to the respective sliding slots. The vehicle seat also includes opposing rear attachments coupling the cushion frame to the respective pivot slots. To reposition the cushion frame from the seating position to the stadium position, the cushion frame is translated forward along the pivot slots prior to pivoting the cushion frame about the front attachments to the stadium position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

FIGS. 1-17 illustrate components of a vehicle seat 10 for use in an automotive vehicle according to embodiments described herein. Directional references employed or shown in the description, figures, or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
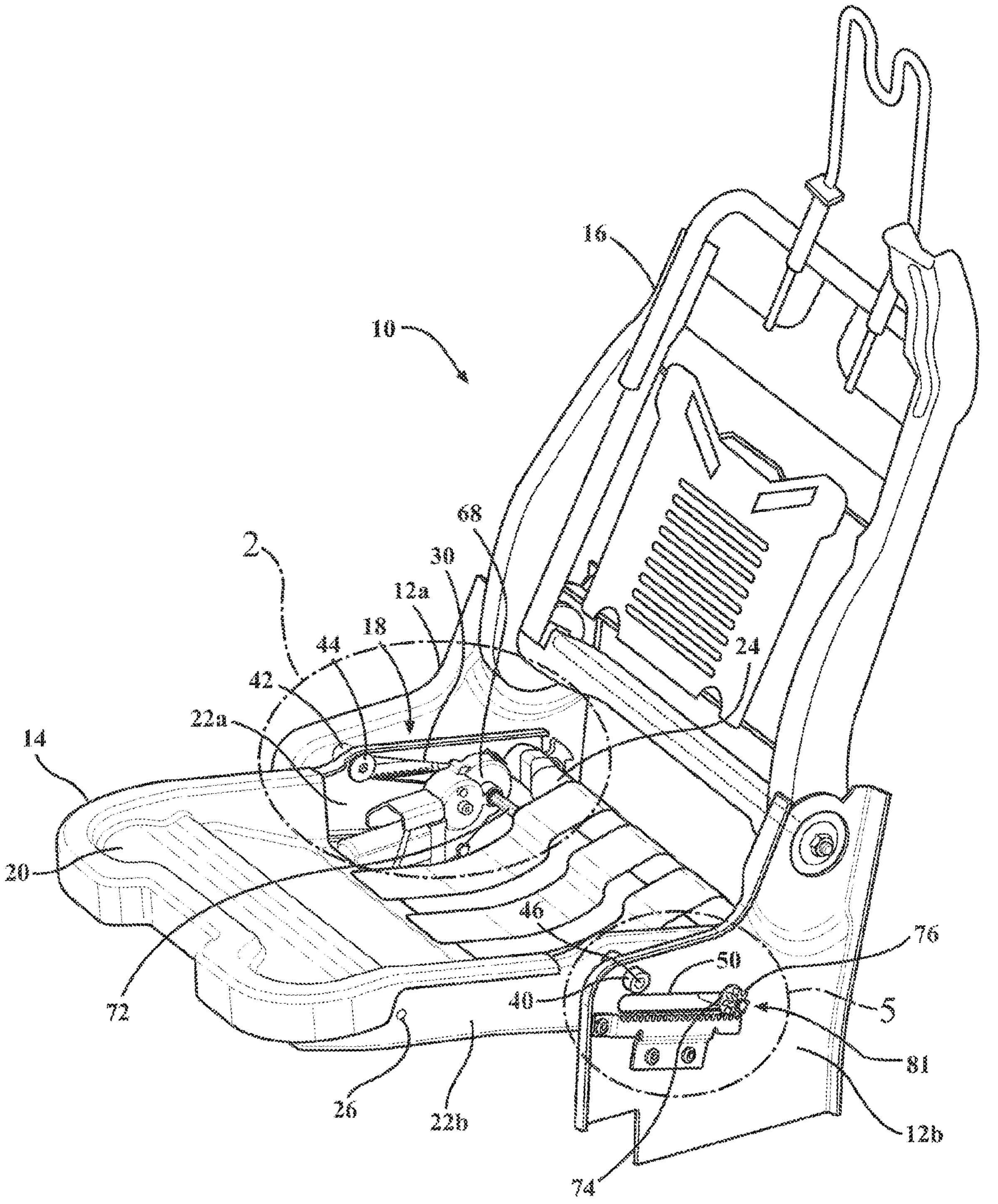
FIG. 1 is a right front perspective view of a vehicle seat including a back frame and a cushion frame, showing the cushion frame in a seating position, according to one embodiment of the present invention.
Figure 2:
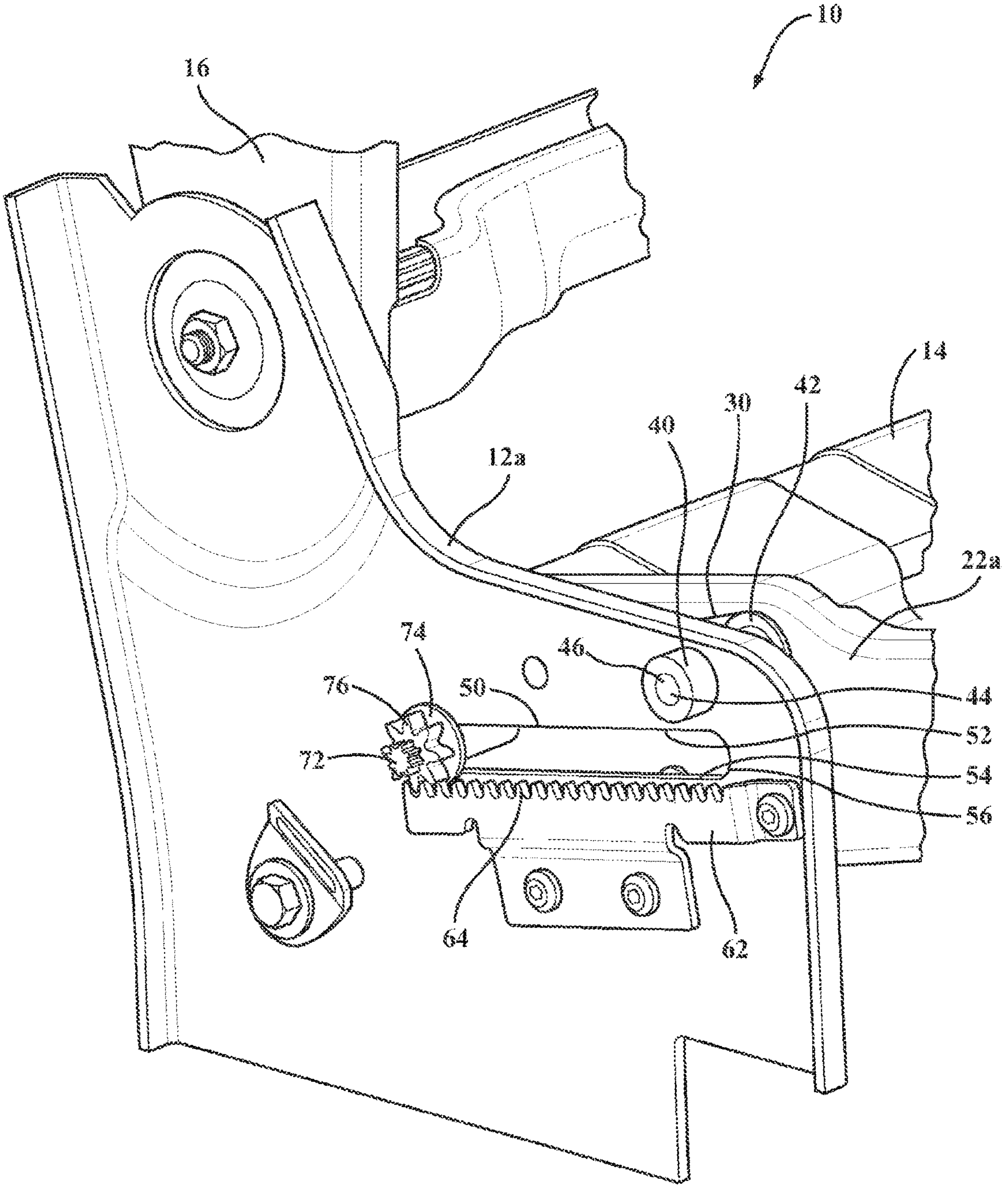
FIG. 2 is left front perspective view of portion 2 of FIG. 1.

Depicted in FIG. 1, the vehicle seat 10 includes laterally spaced apart inboard and outboard side members **12*a*, 12*b*, a cushion frame 14 operatively coupled to and supported between the side members 12*a*, 12*b*, and a back frame 16 pivotally coupled to the side members 12*a*, 12*b*. In addition, the vehicle seat 10 includes a flip-up mechanism 18 pivotably coupling the cushion frame 14 to the side members 12*a*, 12*b*. The flip-up mechanism 18 uses both translational and rotational movement to reposition the cushion frame 14 between a seating position (FIG. 1) defined by the cushion frame 14 in a generally horizontal position relative to the floor and a stadium position (FIG. 9) defined by the cushion frame 14** in a generally vertical or upright position, alternately described as a flip-up position.

Figure 5:
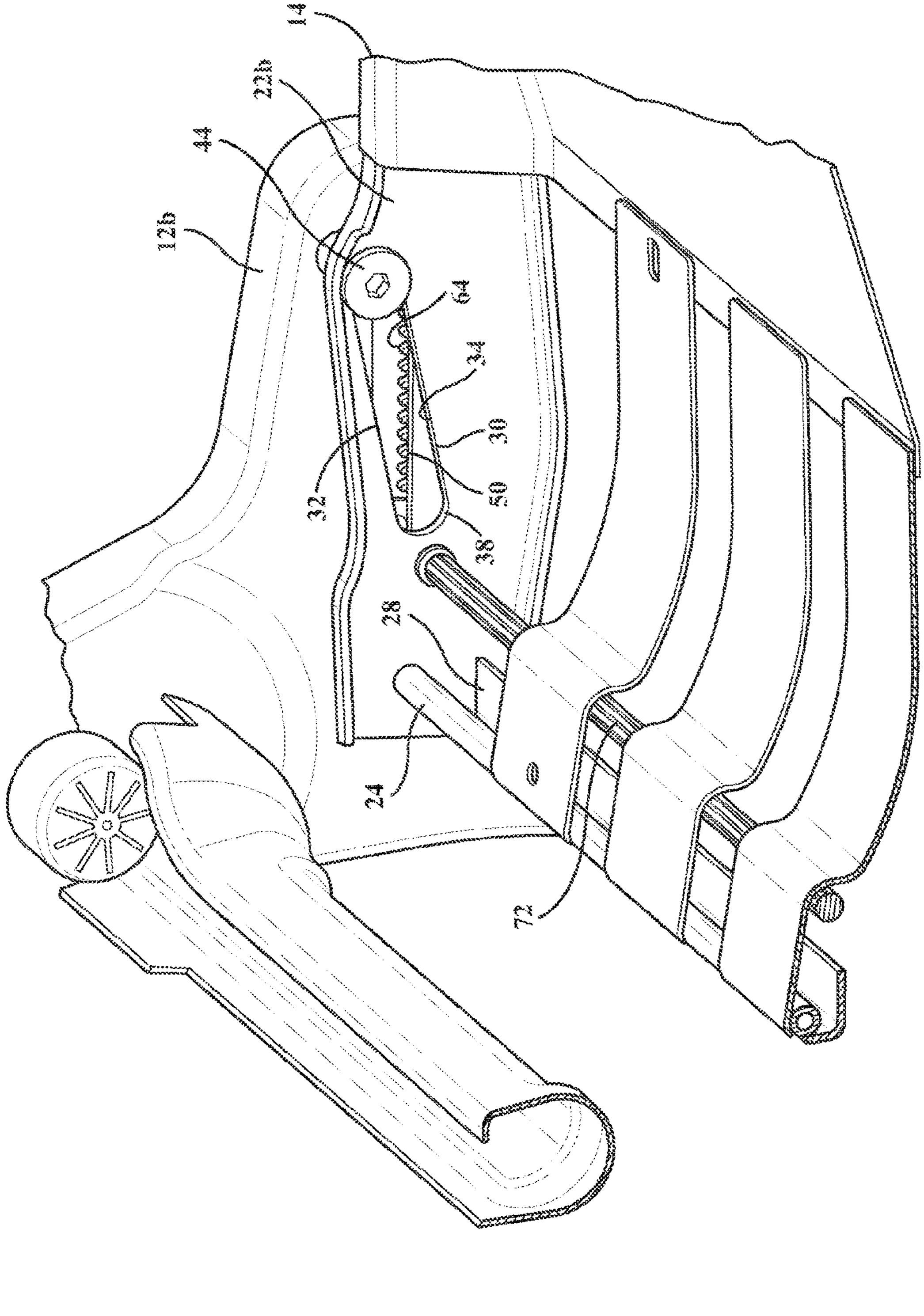
FIG. 5 is a left front perspective view of portion 5 of FIG. 1.
Figure 6:
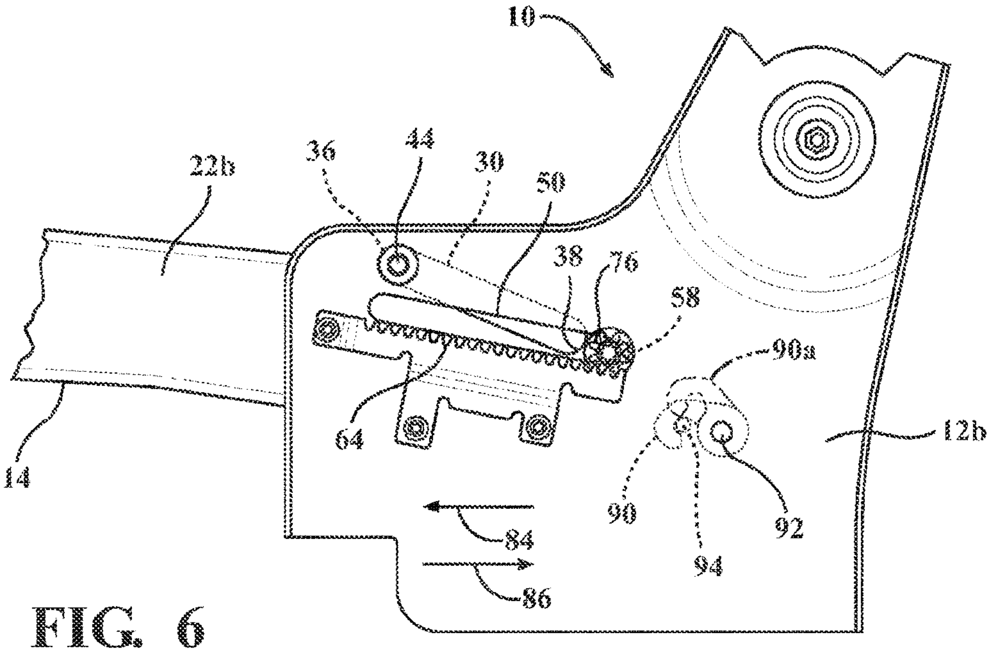
FIG. 6 is a right side view of the vehicle seat of FIG. 1 in the seating position.
Figure 17:
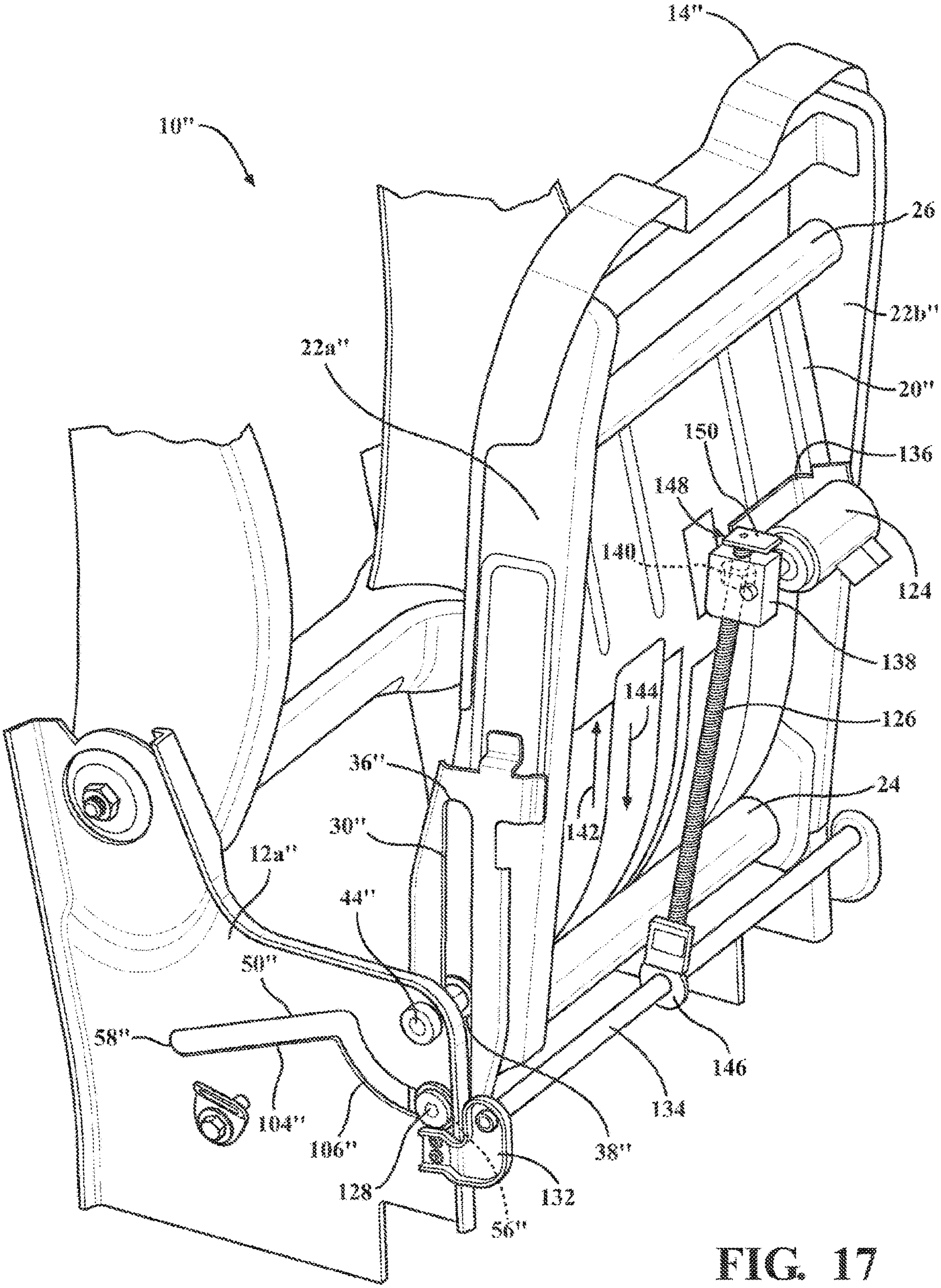
FIG. 17 is a left front perspective view of the vehicle seat of FIG. 14, showing the cushion frame in a stadium position.

Referring to FIGS. 1 and 5, the cushion frame 14 includes a cushion pan 20, laterally spaced apart inboard and outboard cushion side members 22*a*, 22*b*, a cushion rear tube 24, a cushion front tube 26, and a cross brace 28. The cushion pan 20 is fixedly coupled to distal ends of inboard and outboard cushion side members 22*a*, 22*b*. In addition, the inboard and outboard ends of the cushion rear and front tubes 24, 26 and the cross brace 28 are fixedly coupled to the respective inboard and outboard cushion side members 22*a*, 22*b*. The cushion rear and front tubes 24 and 26 are also shown in FIG. 17.

Figure 3:
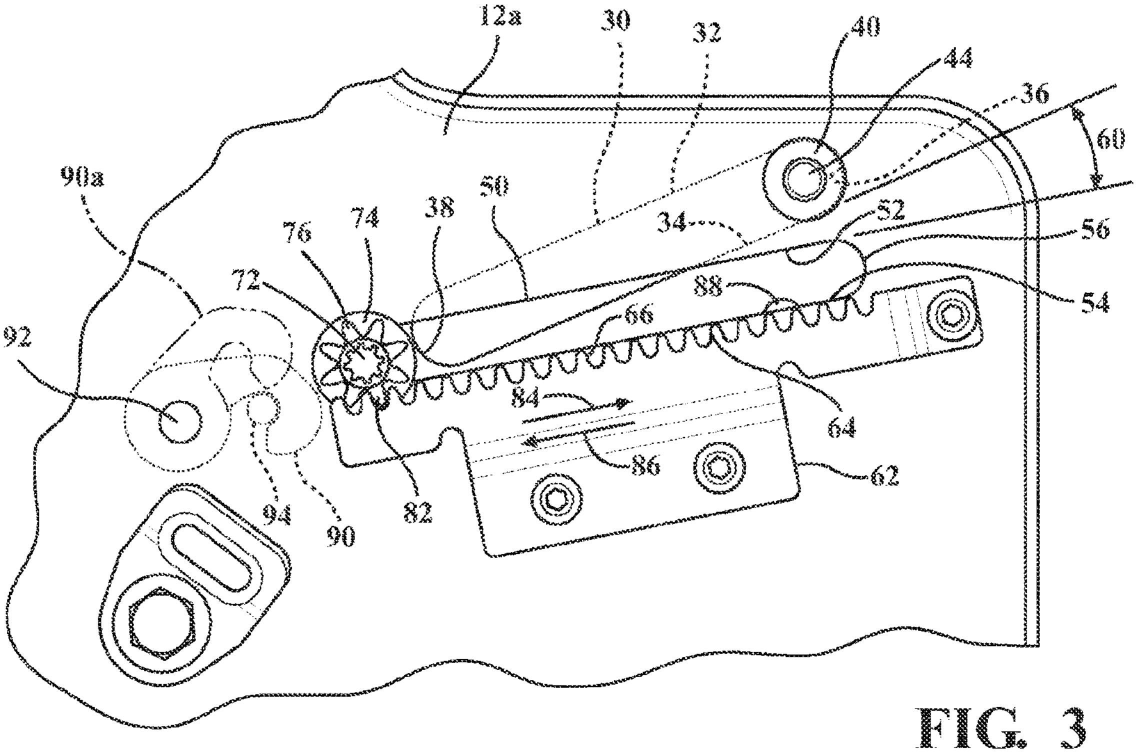
FIG. 3 is a left side view of portion 2 of FIG. 1.
Figure 4:
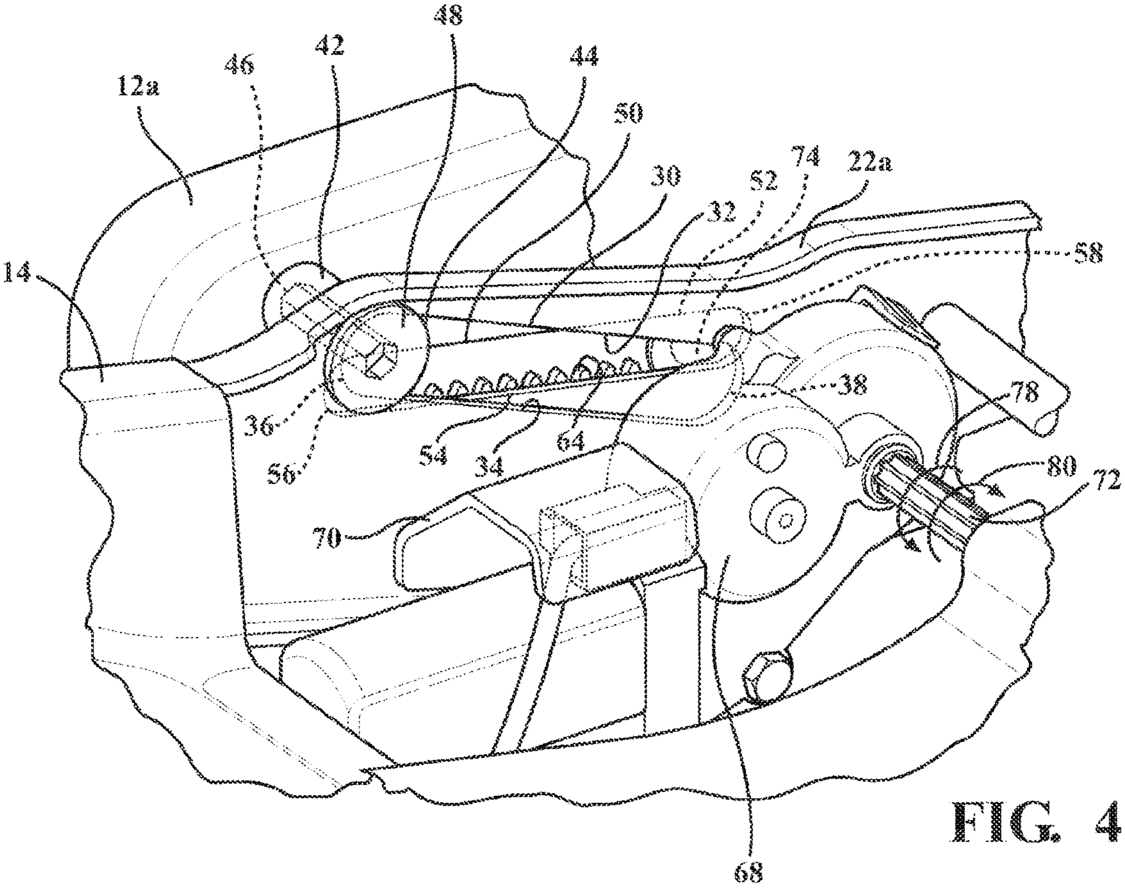
FIG. 4 is a right front perspective view of portion 2 of FIG. 1.

Referring to FIGS. 1-5, the cushion side members 22*a*, 22*b* include a sliding slot 30 extending generally in a longitudinal direction along the cushion side members 22*a*, 22*b*. The sliding slot 30 includes spaced apart upper and lower slot sides 32, 34 extending between a forward end 36 and a rearward end 38. In addition, the vehicle seat 10 includes opposing weld nuts 40, front spacers 42, and front attachments 44. The weld nuts 40 are fixedly coupled to the inboard and outboard side members 12*a*, 12*b* generally laterally aligned with the sliding slot 30 and near the forward end 36 of the sliding slot 30 when the cushion frame 14 is in the seating position (FIG. 1). The front spacers 42 include a passageway (not shown) extending axially through the front spacers 42. The front attachments 44 are formed by shoulder bolts having a bolt shaft 46 extending from a bolt head 48, as shown in FIG. 4. The bolt shafts 46 are inserted through the sliding slots 30 in the respective cushion side member 22*a*, 22*b*, through the passageway in the respective front spacers 42, and fixedly coupled to the weld nuts 40 attached to the respective side members 12*a*, 12*b*. As such, the front attachments 44 are pivot pins that pivotably and slidably couple the cushion frame 14 to the inboard and outboard side members 12*a*, 12*b*. In addition, one or more of a bushing, a washer, and the like may be assembled on the bolt shafts 46 between the cushion side members 22*a*, 22*b* and the bolt heads 48 without altering the scope of the present invention.

Figure 9:
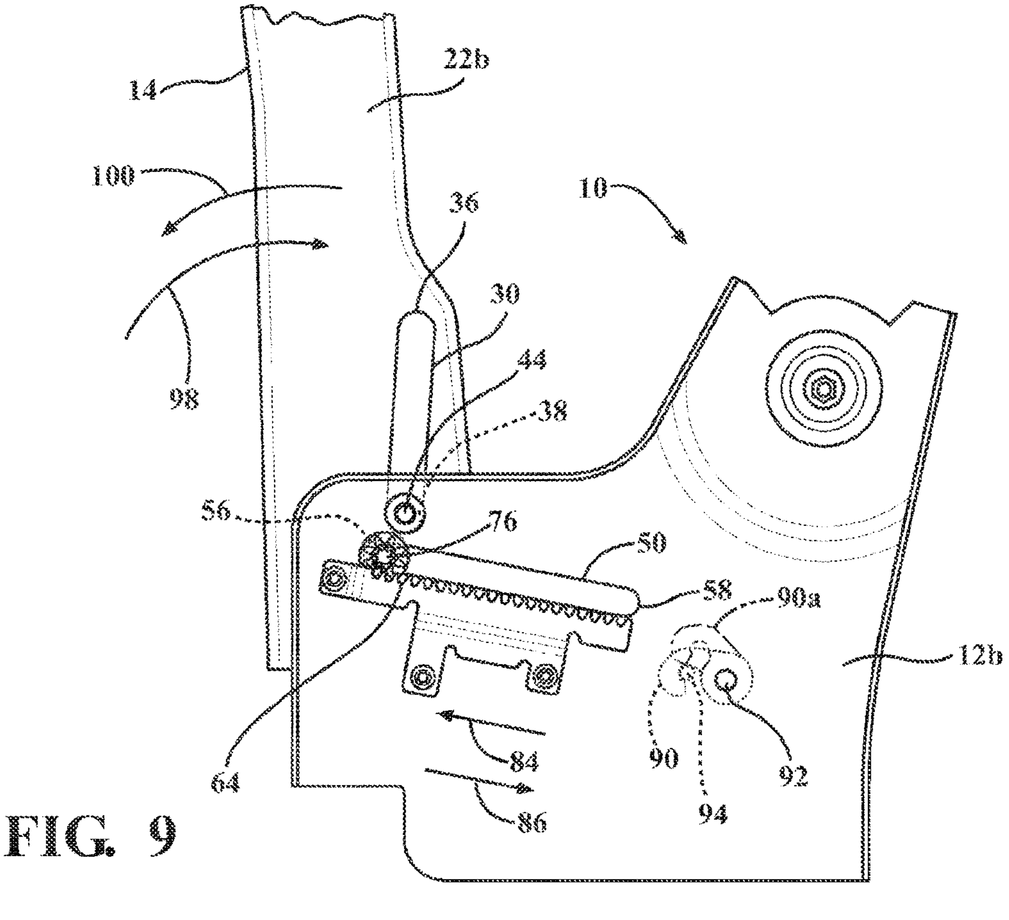
FIG. 9 is a right side view of the vehicle seat of FIG. 8, showing the cushion frame in a stadium position.

Depicted in FIGS. 1-4, the inboard and outboard side members 12*a*, 12*b* include respective pivot slots 50 having spaced apart upper and lower sides 52, 54 extending generally in a longitudinal direction between a front end 56 and a rear end 58. As illustrated in FIG. 3, the pivot slots 50 and the sliding slots 30 are generally non-parallel with each other. Further, the sliding slots 30 extend at slot angle 60 relative to the pivot slots 50 with the slot angle 60 selected to control the pivoting of the cushion frame 14 relative to the side members 12*a*, 12*b* as the cushion frame 14 is rotated between the seating position (FIG. 1) and the stadium position (FIG. 9).

In addition, the vehicle seat 10 includes closing brackets 62 fixedly coupled to the respective inboard and outboard side members 12*a*, 12*b*. The closing brackets 62 include a rack 64 extending longitudinally along an upper surface of the closing brackets 62. The racks 64 include a plurality of spaced apart rack teeth 66. The racks 64 are positioned on the inboard and outboard side members 12*a*, 12*b* such that the racks 64 extend along lower sides 54 of the pivot slots 50 with the rack teeth 66 oriented towards the pivot slots 50. It will be appreciated that the racks 64 might be positioned along the upper side 52 of the pivot slots 50 without altering the scope of the present invention.

Referring to FIGS. 3 and 4, the vehicle seat 10 also includes a swivel motor assembly 68, a mounting bracket 70, a synchronization rod 72, pinion bushings 74, and pinions 76. The swivel motor assembly 68 is fixedly coupled to the mounting bracket 70 which is fixedly coupled to the cushion frame 14. In the embodiment shown in FIG. 4, the mounting bracket 70 is fixedly coupled to the inboard cushion side member 22*a*. It will be appreciated that the swivel motor assembly 68 might be mounted at different locations on the cushion frame 14 without altering the scope of the present invention. The synchronization rod 72 is configured as a motor shaft extending laterally through the swivel motor assembly 68. The swivel motor assembly 68 is operatively coupled to the synchronization rod 72 and configured to selectively rotate the synchronization rod 72 in forward and rearward rotational directions 78, 80. The distal ends of the synchronization rod 72 are passed through holes (not shown) in the inboard and outboard cushion side members 22*a*, 22*b*, through the pivot slots 50, through passageways (not shown) extending axially through the pinion bushings 74, and fixedly coupled to respective pinions 76. While not shown in the Figures, circlips might be attached near the distal ends of the synchronization rod 72 to fixedly couple the pinions 76 to the synchronization rod 72. The pinion bushings 74 might also function as spacers. Depicted in FIG. 1, the synchronization rod 72, the pinion bushings 74, and the pinions 76 define rear attachments 81 coupling the cushion frame 14 to the side members 12*a*, 12*b*. As shown in FIG. 3, the pinions 76 include a plurality of pinion teeth 82 meshingly engaged with the rack teeth 66 on the racks 64. In operation, when the swivel motor assembly 68 rotates the synchronization rod 72 in the forward rotational direction 78, the pinions 76 travel along the racks 64 in a forward direction 84 towards the front end 56 of the pivot slots 50. In addition, when the swivel motor assembly 68 rotates the synchronization rod 72 in the rearward rotational direction 80, the pinions 76 travel along the racks 64 in a rearward direction 86 towards the rear end 58 of the pivot slots 50. Depicted in FIG. 3, the vehicle seat 10 might also include a detent 88 fixedly coupled to one of the side members 12*a*, 12*b* and protruding into the pivot slot 50. The detent 88 is spaced apart from the front end 56 of the pivot slot 50 and configured to retain the pinion 76 near the front end 56 of the pivot slot 50 while the cushion frame 14 is in the stadium position (FIG. 9) without loading other components.

Also shown in FIG. 3, the vehicle seat 10 includes a latch hook 90 pivotably coupled to one of the side members 12*a*, 12*b* by a latch pivot 92. It will be appreciated that the latch hook 90 might be pivotably coupled to alternate locations on the vehicle set 10 without altering the scope of the present invention. In addition, the vehicle seat 10 includes a striker 94 fixedly coupled to the cushion frame 14, such as being fixedly coupled to one of the cushion side members 22*a*, 22*b* as a non-limiting example. The latch hook 90 is selectively pivotable between a latched condition with the striker 94 (shown as latch hook 90) and an unlatched condition spaced apart from the striker 94 (shown as latch hook 90*a*). The latch hook 90 is engaged with the striker 94 when the cushion frame 14 is in the seating position. The latch hook 90 is selectively pivoted to the unlatched condition 90*a* by manual or automatic actuator, handle, cable or the like, prior to pivoting the cushion frame 14 to the stadium position (FIG. 9).

Figure 7:
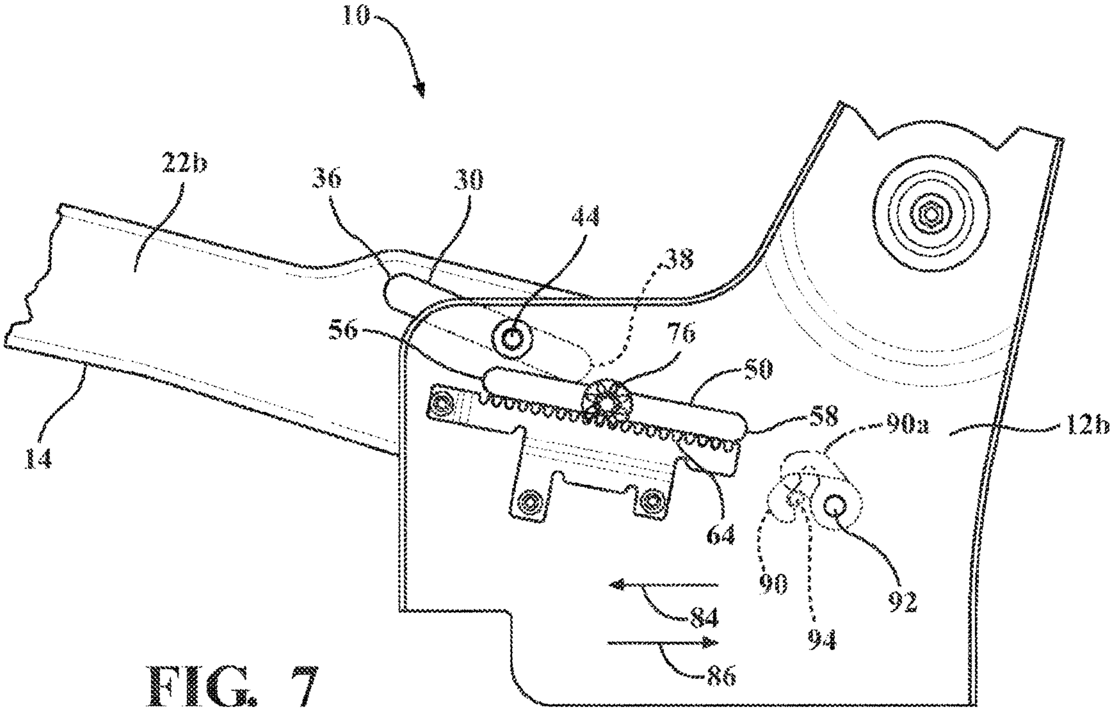
FIG. 7 is a right side view of the vehicle seat of FIG. 6, showing the cushion frame translated forward.

FIGS. 6-9 illustrate a process to pivot the cushion frame 14 between the seating position (FIG. 6) and the stadium position (FIG. 9), according to one embodiment of the present invention. The vehicle seat 10 is shown in the seating position (FIG. 6) with the latch hook 90 engaged with the striker 94, the pinions 76 adjacent the rear end 58 of the pivot slots 50, and the front attachments 44 adjacent the forward end 36 of the sliding slots 30. When the vehicle seat 10 is in the seating position shown in FIG. 6, the occupant initiates a flip-up process causing the latch hook 90 to pivot about the latch pivot 92 to the unlatched position 90*a* disengaged from the striker 94. Next, the swivel motor assembly 68 is activated causing the synchronization rod 72 to rotate in the forward rotational direction 78 (FIG. 4) which causes the pinions 76 to travel along the racks 64 in the forward direction 84 towards the front end 56 of the pivot slots 50. Referring to FIG. 7, as the pinions 76 travel along the racks 64 in the forward direction 84, the cushion frame 14 is translated forward (arrow 84) as the sliding slots 30 are translated along the front attachments 44. Depicted in FIG. 8, additional forward travel (arrow 84) of the pinions 76 along the racks 64 causes the cushion frame 14 to be translated forward (arrow 84) relative to the front attachments 44 until the front attachments 44 frictionally engage with the rearward ends 38 of the sliding slots 30. After the front attachments 44 engage with the rearward ends 38 of the sliding slots 30, additional forward travel (arrow 84) of the pinions 76 along the racks 64 causes the cushion frame 14 to pivot upward (arrow 98) around the front attachments 44 to the stadium position shown in FIG. 9. The swivel motor assembly 68 is deactivated once the pinions 76 are adjacent to the front ends 56 of the pivot slots 50 and the cushion frame 14 is in the stadium position. The cushion frame 14 is retained in the stadium position until the occupant initiates a flip-down process.

Figure 8:
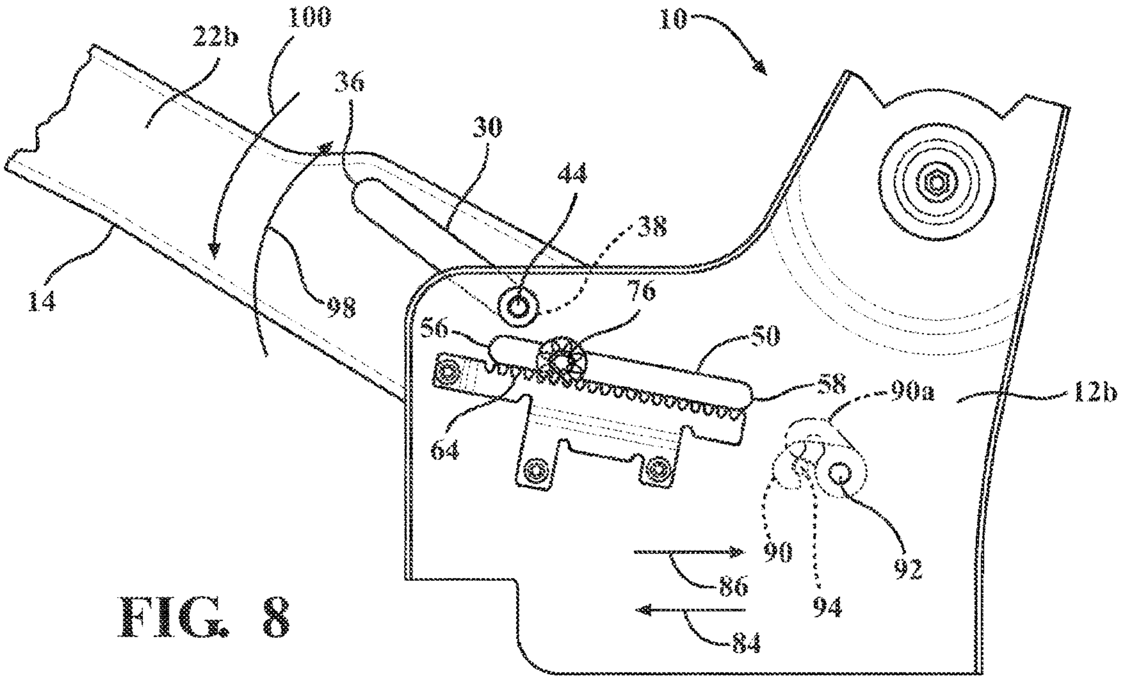
FIG. 8 is a right side view of the vehicle seat of FIG. 7, showing the cushion frame translated forward and partially rotated upwardly.

The process is reversed to return the cushion frame 14 to the seating position from the stadium position. When the vehicle seat 10 is in the stadium position shown in FIG. 9, the occupant initiates the flip-down process. Next, the swivel motor assembly 68 is activated causing the synchronization rod 72 to rotate in the rearward rotational direction 80 (FIG. 4) which causes the pinions 76 to travel along the racks 64 in the rearward direction 86 towards the rear ends 58 of the pivot slots 50. Referring to FIG. 8, during initial rearward travel (arrow 86) of the pinions 76 along the racks 64, the cushion frame 14 is pivoted downward (arrow 100) towards the seating position as the sliding slot 30 pivots downward (arrow 100) around the front attachments 44. Referring to FIGS. 7 and 8, after the cushion frame 14 rotates downward (arrow 100), additional travel of the pinions 76 in the rearward direction (arrow 86) along the racks 64 causes the front attachments 44 to disengage from the rear ends 58 of the sliding slots 30. Additional travel of the pinions 76 in the rearward direction (arrow 86) causes the sliding slots 30 to be translated along the front attachments 44 and causes the cushion frame 14 to be translated rearward (arrow 86) towards the seating position shown in FIG. 6. The swivel motor assembly 68 is deactivated once the pinions 76 are adjacent to the rear ends 58 of the pivot slots 50 and the cushion frame 14 is in the seating position shown in FIG. 6. Next, the latch hook 90 is pivoted about the latch pivot 92 to the latched position engaged with the striker 94. The cushion frame 14 is retained in the seating position until the occupant initiates the flip-up process.

A second embodiment of the vehicle seat 10' is shown in FIGS. 10-13, where like primed reference numerals represent similar elements as those described above. The vehicle seat 10' of the second embodiment shown in FIG. 10 includes a flip-up mechanism 18' with pivot slots 50' having a straight portion 104 and a curved portion 106. In addition, the closing brackets 62' are positioned above the pivot slots 50'. Only significant differences between the two embodiments are reflected in the Figures and the description below.

Figure 11:
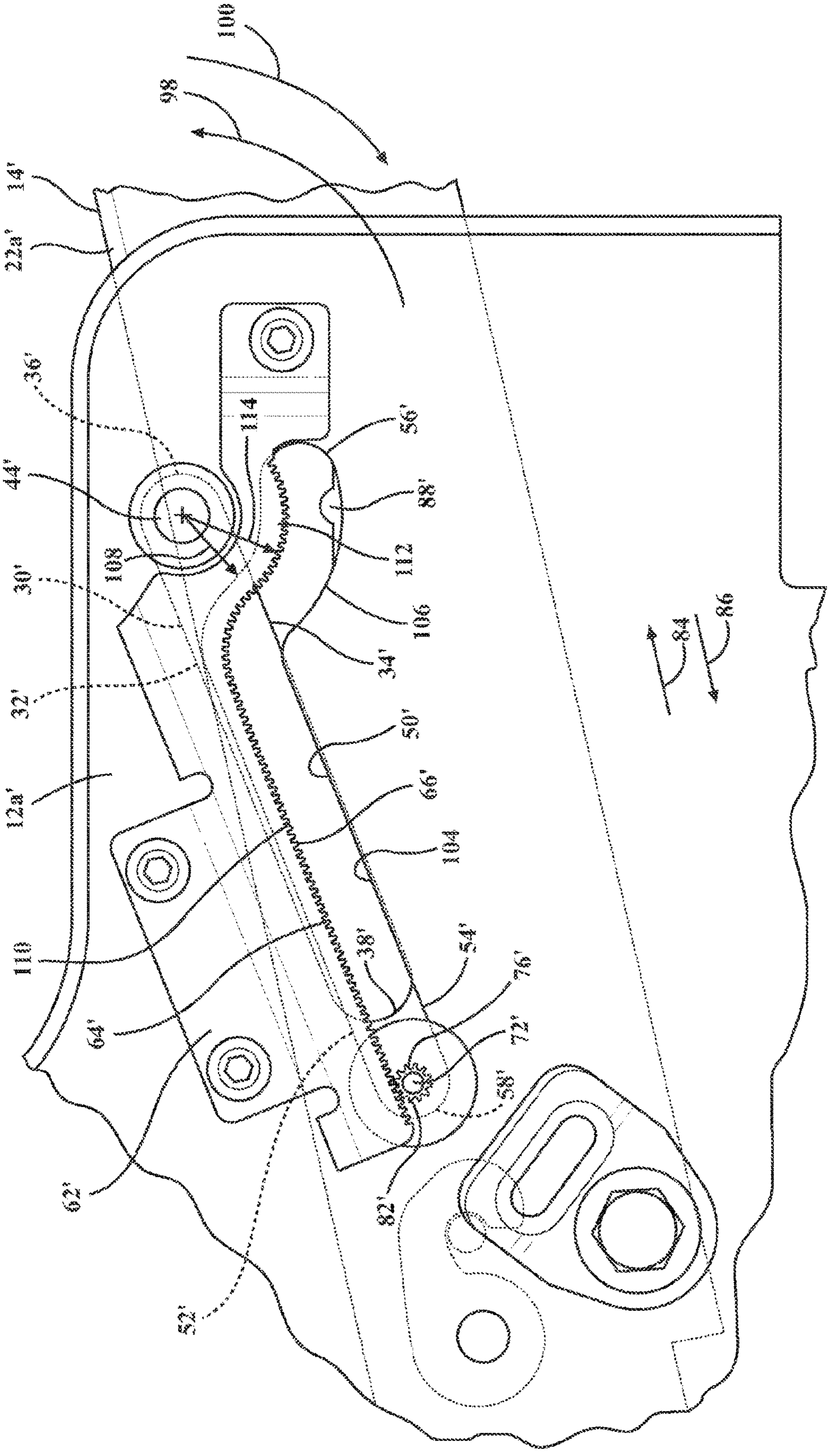
FIG. 11 is a left side view of portion 11 of FIG. 10.

Referring to FIG. 11, the sliding slot 30' includes spaced apart upper and lower sides 32', 34' extending between opposing forward and rearward ends 36', 38'. In addition, the straight portion 104 of the pivot slots 50' extends from the rear end 58' generally towards the front attachments 44'. The curved portion 106 of the pivot slots 50' extends rearward from the front end 56' of the pivot slots 50' and adjoins the straight portion 104. The curved portion 106 of the pivot slots 50' is radially offset from the adjacent front attachments 44' with a radius 108. Likewise, the racks 64' extend along a lower edge of the closing brackets 46' and include a straight rack portion 110 adjoining a curved rack portion 112. The curved rack portion 112 is radially offset from the adjacent front attachments 44 with a radius 114. The radii 108 and 114 are selected such that the pinions 76' pivot the cushion frame 14' about the front attachments 44' after the cushion frame 14' is translated forward (arrow 84). The racks 64' extend longitudinally generally along the upper side 52' of the pivot slots 50'. The straight portion 104 of the pivot slots 50' and the straight rack portion 110 are generally parallel to the adjacent sliding slots 30'.

Further, the pinion teeth 82' are meshingly engaged with the rack teeth 66'. Comparing the first and second embodiment, the pinion teeth 82' and the rack teeth 66' have a smaller tooth profile in the second embodiment than the pinion teeth 82 and the rack teeth 66 of the first embodiment. It will be appreciated that the pinion teeth 82, 82' and the rack teeth 66, 66' might be larger or smaller sized teeth without altering the scope of the present invention.

Figure 12:
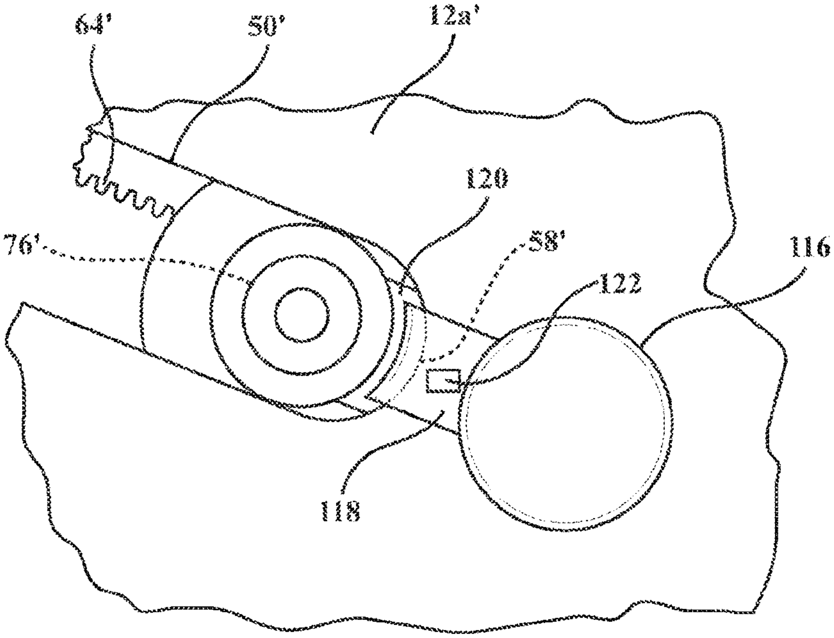
FIG. 12 is a left side view of portion 12 of FIG. 10, showing a pinion positioned near a rear end of the pivot slot adjacent a bumper system.

Referring to FIG. 12, the vehicle seat 10' also includes a bumper system 116 fixedly coupled to the inboard side member 12*a*' and positioned adjacent the rear end 58' of the pivot slot 50'. It will be appreciated that the bumper system 116 might be mounted in other locations without altering the scope of the present invention. The bumper system 116 includes a bumper 118 positioned to restrict rearward movement of the pinion 76' along the rack 64'. In addition, the bumper system 116 might include one or more of a hall sensor 120 and/or a limit switch 122 configured to detect that the pinion 76 is adjacent to the rear end 58 of the pivot slot 50 and that the cushion frame 14 is in the seating position. The vehicle seat 10 deactivates the swivel motor assembly 68 when the hall sensor 120 and/or the limit switch 122 detects the presence of the pinion 76 to prevent tooth damage on the rack 64' and pinion 76'.

Figure 13:
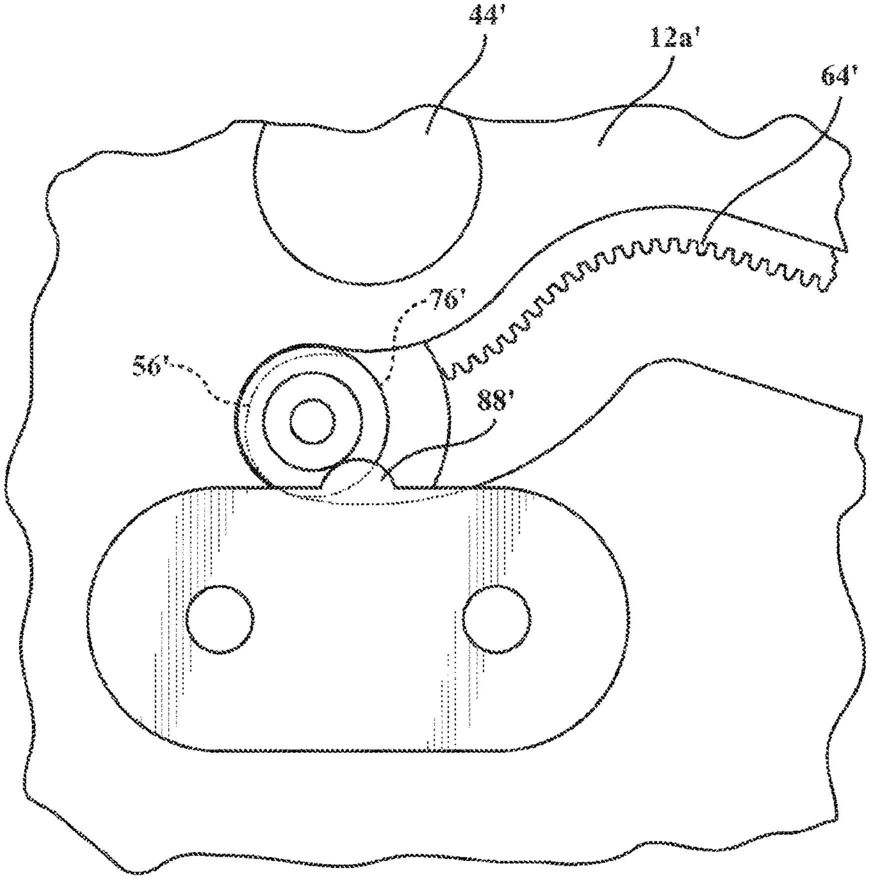
FIG. 13 is a left side view of portion 13 of FIG. 10, showing a pinion positioned at a front end of the pivot slot adjacent a detent.

Shown in FIG. 13, the vehicle seat 10' includes a detent 88' fixedly coupled to the inboard side member 12*a*' and positioned adjacent the front end 56' of the pivot slot 50'. The detent 88' protrudes into the pivot slot 50'. The detent 88' is spaced apart from the front end 56' of the pivot slot 50' and configured to retain the pinion 76' near the front end 56' of the pivot slot 50' while the cushion frame 14' is in the stadium position without loading other components.

In operation, when the cushion frame 14' is in the seating position and the occupant initiates the flip-up process, the swivel motor assembly 68 causes the pinions 76' to travel along the racks 64' in the forward direction 84 towards the front end 56' of the pivot slots 50'. The cushion frame 14' is translated forward (arrow 84) as the pinions 76' travel forward (arrow 84) along the straight rack portions 110 which cause the sliding slots 30' to slide along the front attachments 44'. After the front attachments 44' engage with the rearward ends 38' of the sliding slots 30', the pinions 76' travel along the curved rack portions 112 which cause the cushion frame 14' to rotate upward (arrow 98) to the stadium position. The swivel motor assembly 68 is deactivated once the pinions 76' are adjacent to the front ends 56' of the pivot slots 50' and the cushion frame 14' is in the stadium position. The cushion frame 14' is retained in the stadium position by the detent 88' and the deactivated swivel motor assembly 68 until the occupant initiates the flip-down process.

Figure 10:
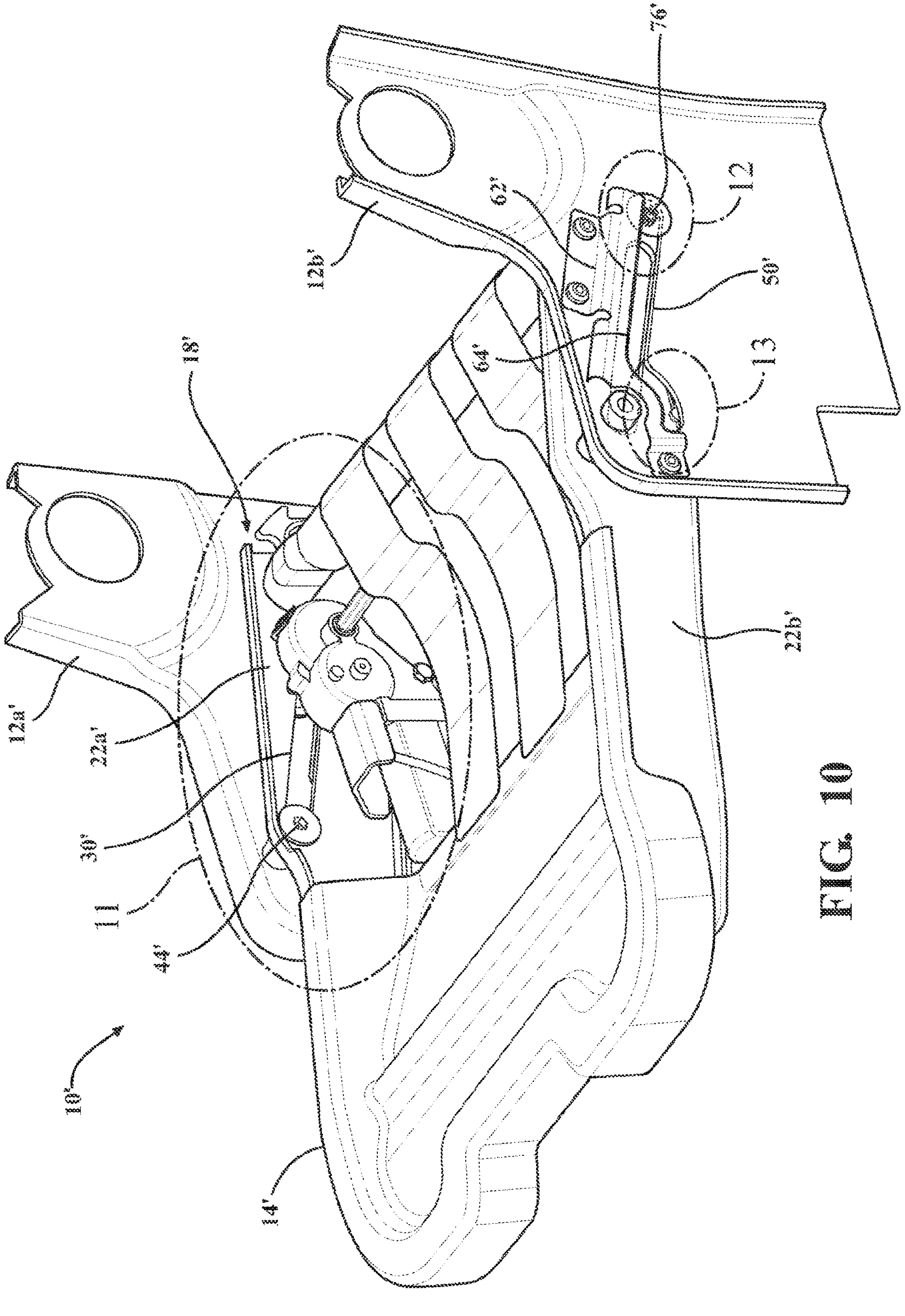
FIG. 10 is a right front perspective view of a vehicle seat showing a cushion frame in a seating position, according to another embodiment of the present invention.

The process is reversed to return the cushion frame 14' to the seating position from the stadium position. When the vehicle seat 10' is in the stadium position shown in FIG. 9, the occupant initiates the flip-down process. Next, the swivel motor assembly 68 is activated causing the pinions 76' to travel along the racks 64' in the rearward direction 86 along the curved rack portions 112 which causes the cushion frame 14' to be pivoted downward (arrow 100) about the front attachments 44'. As the pinions 76' travel rearward (arrow 86) along the straight rack portions 110 of the racks 64', the cushion frame 14' is translated rearward (arrow 86) towards the seating position shown in FIG. 10. The swivel motor assembly 68 is deactivated once the pinions 76' are adjacent the rear end 58' of the pivot slots 50' and the cushion frame 14' is in the seating position (FIG. 10). Alternatively, the swivel motor assembly 68 is deactivated when the hall sensor 120 and/or the limit switch 122 detects that the cushion frame 14' is in the seating position.

A third embodiment of the vehicle seat 10" is shown in FIGS. 14-17, where like double primed reference numerals represent similar elements as those described above. The vehicle seat 10" of the third embodiment shown in FIG. 14-17 includes a flip-up mechanism 18" with pivot slots 50" having a straight portion 104" and a curved portion 106". However, the third embodiment of the vehicle seat 10" lacks the racks 64, 64' and the pinions 76, 76' of the prior embodiments of vehicle seat 10, 10'. In addition, the synchronization rod 72 and the swivel motor assembly 68 of the prior embodiments of vehicle seat 10, 10' have been replaced by a motor assembly 124 operatively coupled to a lead screw 126. Only significant differences between the third embodiment of vehicle seat 10" and the prior embodiments of vehicle seat 10, 10' are reflected in the Figures and the description below.

Figure 14:
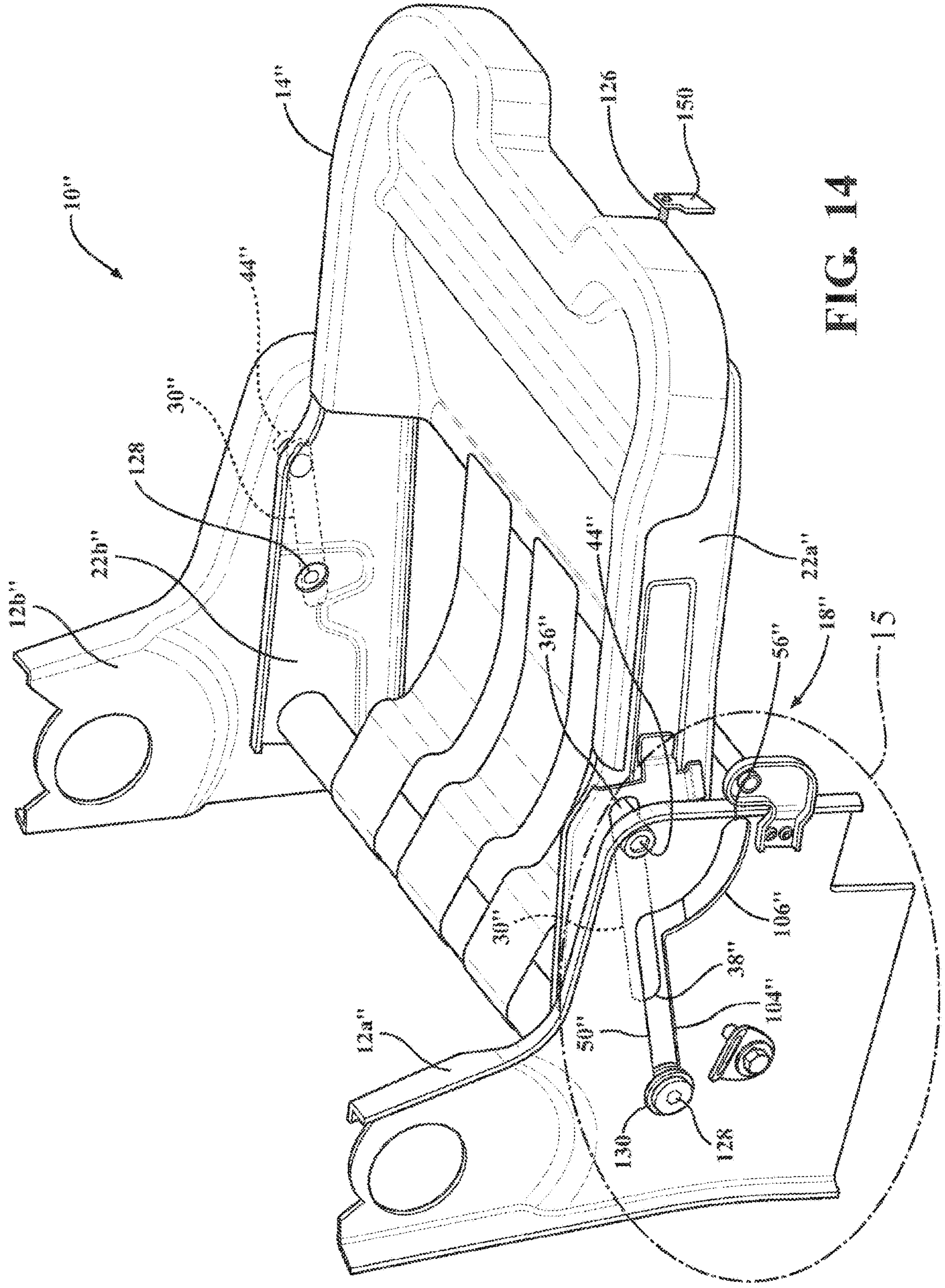
FIG. 14 is a left front perspective view of a vehicle seat showing a cushion frame in a seating position, according to another embodiment of the present invention.
Figure 15:
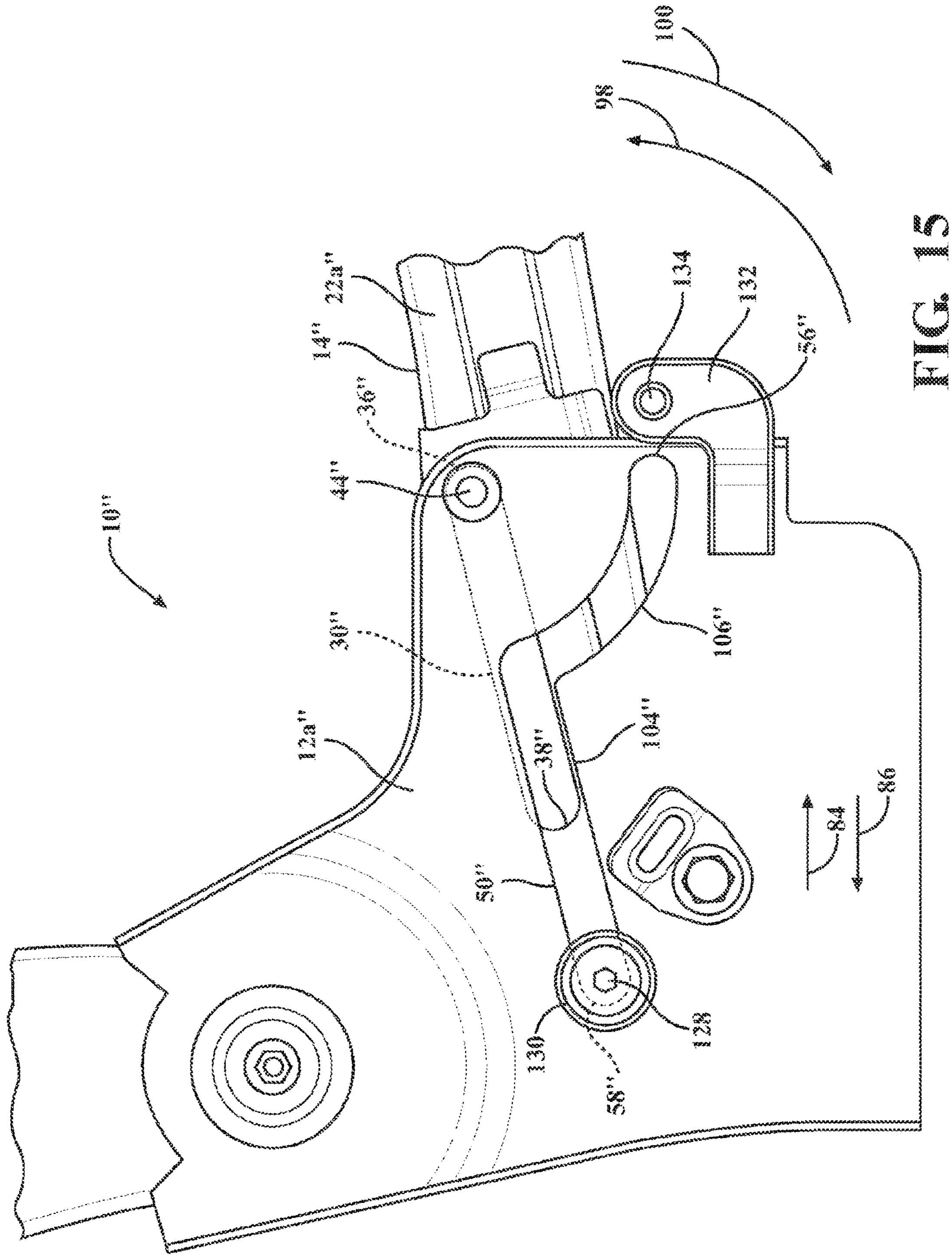
FIG. 15 is a left side view of portion 15 of FIG. 14.

Referring to FIGS. 14 and 15, the inboard and outboard side members **12*a*", 12*b*" include respective pivot slots 50" having a straight portion 104" adjoining a curved portion 106". The straight portion 104" extends from the rear end 58" of the pivot slots 50". In addition, the curved portion 106" extends from the front end 56" of the pivot slots 50". The inboard and outboard cushion side members 22*a*", 22*b*" include respective sliding slots 30" extending between forward and rearward slot ends 36", 38". The sliding slots 30" extend generally parallel to the straight portion 104" of the pivot slots 50". The front attachments 44" are fixedly coupled to the respective side members 12*a*", 12*b*" and slidably coupled to the adjacent sliding slots 30". In addition, the vehicle seat 10" includes rear attachments 128 and rear spacers 130. The rear spacers 130 include a passageway (not shown) extending axially therethrough. The rear attachments 128 extend through the passageway in the respective rear spacers 130, through the respective pivot slots 50" in the side members 12*a*", 12*b*", and are fixedly coupled to the adjacent cushion side members 22*a*", 22*b*". As such, the rear attachments 128 are slidably and pivotably coupled to the respective pivot slots 50"**.

Figure 16:
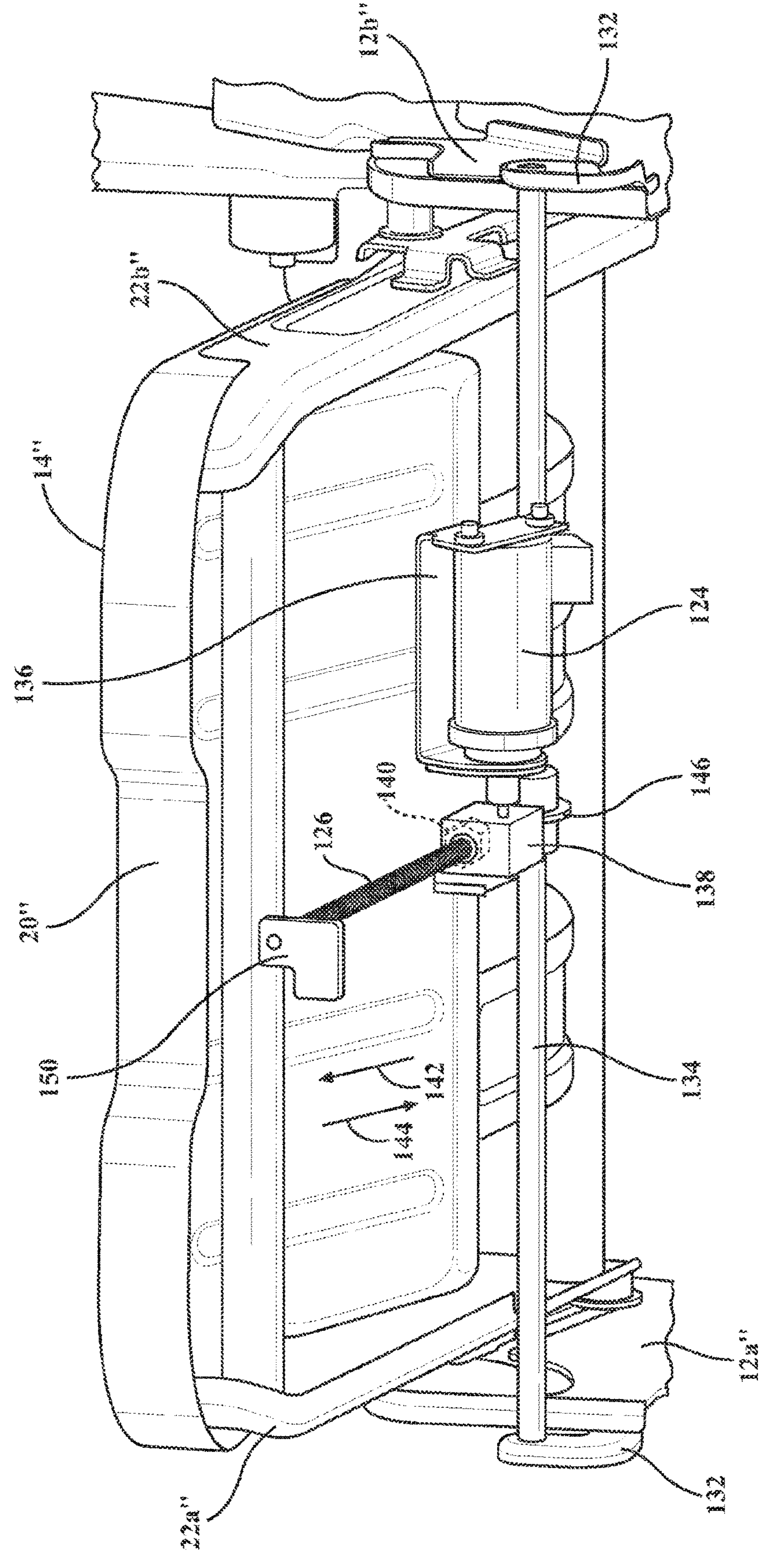
FIG. 16 is a bottom front perspective view of the vehicle seat of FIG. 14.

Referring to FIGS. 15 and 16, the vehicle seat 10" includes spaced apart tube brackets 132 and a pivot tube 134. The tube brackets 132 are generally L-shaped brackets having a lower end fixedly coupled to the respective inboard and outboard side members **12*a*", 12*b*". In addition, the pivot tube 134 includes opposing ends fixedly coupled to an upper end of the respective tube brackets 132. The tube brackets 132 and the pivot tube 134 are positioned below the cushion frame 14" when the cushion frame 14"** is in the seating position.

Depicted in FIGS. 16 and 17, the vehicle seat 10" also includes the motor assembly 124, a motor bracket 136, a gear box 138, and the lead screw 126. The motor assembly 124 is fixedly coupled to the motor bracket 136, which in turn is fixedly coupled to seat pan 20" of the cushion frame 14". It will be appreciated that the motor bracket 136 might be fixedly coupled to other locations on the cushion frame 14" without altering the scope of the present invention. The motor assembly 124 is operatively coupled to the gear box 138 which includes a threaded nut 140 meshingly engaged with the lead screw 126. The lead screw 126 has a lower end 146 pivotably coupled to the pivot tube 134 and an upper end 148 fixedly coupled to an end stop 150 which is free floating. When the motor assembly 124 is actuated in a forward rotational direction, the threaded nut 140 within the gear box 138 is transposed along the lead screw 126 in a forward direction (arrow 142). When the motor assembly 124 is actuated in an opposite rearward rotational direction, the threaded nut 140 within the gear box 138 is transposed along the lead screw 126 in a rearward direction (arrow 144). The forward direction (arrow 142) is opposite the rearward direction (arrow 144). In addition, the forward direction (arrow 142) and the rearward direction (arrow 144) are alternatively described as the first and second directions, respectively.

In operation, when the cushion frame 14" is in the seating position (FIGS. 14-16) and the occupant initiates the flip-up process, the motor assembly 124 is activated in the forward direction which causes the threaded nut 140 to travel along the lead screw 126 in the forward direction (arrow 142). As the threaded nut 140 travels forward (arrow 142) along the lead screw 126, the rear attachments 128 slide forward along the straight sections 104" of the pivot slots 50" and the sliding slots 30" slide forward (arrow 84) along the front attachments 44" which causes the cushion frame 14" to slide forward (arrow 84). Additional movement of the threaded nut 140 in the forward direction (arrow 142) causes the front attachments 44" to frictionally engage with the rearward ends 38" of the sliding slots 30" and causes the rear attachments 128" to enter the curved portions 106" of the pivot slots 50". After the front attachments 44" frictionally engage the rearward ends 38" of the pivot slots 50", additional movement of the threaded nut 140 in the forward direction (arrow 142) causes the rear attachments 128 to slide along the curved portions 106" of the pivot slots 50" causing the cushion frame 14" to pivot upward (arrow 98). The lower end 146 of the lead screw 126 is pivotably coupled to the pivot tube 134 which allows the cushion frame 14" to pivot upward. The motor assembly 124 is deactivated once the cushion frame 14" is in the stadium position (FIG. 17) and the rear attachments 128 are adjacent to the front ends 56" of the pivot slots 50". The cushion frame 14" is retained in the stadium position by the deactivated motor assembly 124 until the occupant initiates the flip-down process.

The process is reversed to return the cushion frame 14" to the seating position from the stadium position. When the vehicle seat 10" is in the stadium position shown in FIG. 17, the occupant initiates the flip-down process. Next, the motor assembly 124 is activated in the rearward direction which causes the threaded nut 140 to travel along the lead screw 126 in the rearward direction (arrow 144). As the threaded nut 140 travels rearward (arrow 144) along the lead screw 126, the rear attachments 128 slide rearward along the curved portions 106" of the pivot slots 50" which causes the cushion frame 14" to pivot downward (arrow 100) about the front attachments 44". Additional movement of the threaded nut 140 in the rearward direction (arrow 144) causes the rear attachments 128 to enter the straight portions 104" of the pivot slots 50". After the rear attachments 128 enter the straight portions 104" of the pivot slots 50", additional movement of the threaded nut 140 in the rearward direction (arrow 144) causes the sliding slots 30" to slide rearward relative to the front attachments 44" and causes the rear attachments 128 to slide rearward along the straight portions 104" of the pivot slots 50", which in turn causes the cushion frame 14" to be transposed rearward (arrow 86). The motor assembly 124 is deactivated once the cushion frame 14" is in the seating position (FIG. 14) and the rear attachments 128 are adjacent to the rear ends 58" of the pivot slots 50".

It will be appreciated that the motor assembly 124, the lead screw 126, and the pivot tube 134 might be omitted when the vehicle seat 10" is configured to be pivoted manually by the occupant between the seating position and the stadium position without altering the scope of the present invention.

As discussed above, the vehicle seat 10, 10', 10" of the present invention includes a flip-up mechanism 18, 18', 18" configured to automatically pivot the cushion frame 14, 14', 14" between a seating position and a stadium position using both translational and rotational movements of the cushion frame 14, 14', 14". The flip-up mechanisms 18, 18', 18" include front attachments 44, 44', 44" fixedly coupled to respective side members 12*a*, 12*a*', 12*a*", 12*b*, 12*b*', 12*b*" and slidably coupled to respective sliding slots 30, 30', 30" extending in generally a longitudinal direction along the cushion side members 22*a*, 22*a*', 22*a*", 22*b*, 22*b*', 22*b*". In addition, the first and second embodiments of the flip-up mechanism 18, 18' include a swivel motor assembly 68 fixedly coupled to the cushion frame 14, 14' and operatively coupled to a synchronization rod 72 having opposing ends fixedly coupled to pinions 76, 76' which are meshingly engaged with respective racks 64, 64' extending along pivot slots 50, 50' in the respective side members 12*a*, 12*a*', 12*b*, 12*b*'. The flip-up mechanism 18" of the third embodiment includes a motor assembly 124 fixedly coupled to the cushion frame 14" and operatively coupled to a threaded nut 140 meshingly engaged with a lead screw 126 that is pivotably coupled the side members 12*a*", 12*b*". In addition, the flip-up mechanism 18" includes rear attachments 128 fixedly coupled to the cushion frame 14" and slidably coupled to pivot slots 50" in the respective side members 12*a*", 12*b*". To pivot the cushion frame 14, 14', 14" to the stadium position, the flip-up mechanism 18, 18', 18" causes the cushion frame 14, 14', 14" to be translated forward followed by rotating the cushion frame 14, 14', 14" upward about the front attachments 44, 44', 44" to the stadium position. The process is reversed to return the cushion frame 14, 14', 14" to the seating position.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A vehicle seat for an automotive vehicle, the vehicle seat comprising:

a pair of laterally spaced apart side members having respective pivot slots;

a cushion frame supported between the side members and including laterally spaced apart cushion side members having respective sliding slots, the cushion frame is repositionable between a seating position and a stadium position;

opposing front attachments fixedly coupled to the respective side members and pivotably and slidably coupled to the respective sliding slots; and opposing rear attachments coupling the cushion frame to the respective pivot slots;

wherein to reposition the cushion frame from the seating position to the stadium position, the cushion frame is translated forward along the pivot slots prior to pivoting the cushion frame about the front attachments to the stadium position.

2. The vehicle seat as set forth in claim 1, further comprising:

a swivel motor assembly fixedly coupled to the cushion frame; and opposing racks fixedly coupled to the respective side members and extending along the respective pivot slots;

wherein the rear attachments further include a synchronization rod operatively coupled to the swivel motor assembly and having opposing ends fixedly coupled to respective pinions meshingly engaged with the respective racks; and wherein the swivel motor assembly is configured to selectively rotate the synchronization rod in a forward rotational direction and a rearward rotational direction which causes the pinions to travel along the racks in a forward direction and a rearward direction, respectively.

3. The vehicle seat as set forth in claim 2, wherein:

when the cushion frame is in the seating position and the swivel motor assembly rotates the synchronization rod in the forward rotational direction, the pinions travel in the forward direction along the racks causing the cushion frame to translate forward with the sliding slots sliding along the front attachments.

4. The vehicle seat as set forth in claim 3, wherein:

the cushion frame is translated forward in response to the pinions traveling in the forward direction along the racks until the front attachments frictionally engage rearward ends of the sliding slots; and the cushion frame is pivoted upward about the front attachments in response to the pinions traveling in the forward direction along the racks after the front attachments frictionally engage with the rearward ends of the sliding slots.

5. The vehicle seat as set forth in claim 4, wherein:

when the cushion frame is in the stadium position with the front attachments frictionally engaged with the rearward ends of the sliding slots and the swivel motor assembly rotates the synchronization rod in the rearward rotational direction, the pinions travel in the rearward direction along the racks causing the cushion frame to pivot downward about the front attachments while the front attachments are frictionally engaged with the rearward ends of the sliding slots.

6. The vehicle seat as set forth in claim 5, wherein:

the cushion frame is translated rearward in response to the pinions traveling in the rearward direction along the racks after the front attachments disengage from the rearward ends of the sliding slots.

7. The vehicle seat as set forth in claim 6, wherein:
the pivot slots include an upper side spaced apart from a lower side; and
the racks are fixedly coupled to the side members adjacent to one of the lower side and the upper side of the respective pivot slots.

8. The vehicle seat as set forth in claim 7, further comprising:
opposing bushings having a passageway extending axially therethrough;
wherein the synchronization rod extends through the passageway in the bushings and the bushings extend laterally through the respective pivot slots.

9. The vehicle seat as set forth in claim 8, further comprising:
a detent fixedly coupled to one of the side members and extending into the adjacent pivot slot, the detent configured to frictionally engage with one of the bushings when the cushion frame is in the stadium position.

10. The vehicle seat as set forth in claim 7, further comprising a bumper system fixedly coupled to one of the side members, the bumper system including a bumper configured to restrict rearward movement of the pinions along the pivot slots.

11. The vehicle seat as set forth in claim 10, the bumper system further comprising one or more of a hall sensor and a limit switch;
wherein the swivel motor assembly is deactivated in response to the one or more of the hall sensor and the limit switch detecting the pinion adjacent a rear end of the pivot slot.

12. The vehicle seat as set forth in claim 7, wherein:
the pivot slots are non-parallel to the sliding slots.

13. The vehicle seat as set forth in claim 12, wherein:
the pivot slots extend in a longitudinal direction;
the sliding slots extend in a longitudinal direction; and
when the cushion frame is in the seating position, the sliding slots extend at a slot angle relative to the adjacent pivot slot.

14. The vehicle seat as set forth in claim 7, wherein:
the racks include a straight portion adjoining a curved portion;
the curved portion is radially offset from the respective front attachments.

15. The vehicle seat as set forth in claim 14, wherein:
the cushion frame is translated forward from the seating position as the pinions travel forward along the straight portions of the racks; and
the cushion frame is pivoted upward towards the stadium position as the pinions travel forward along the curved portions of the racks.

16. The vehicle seat as set forth in claim 15, wherein:
the cushion frame is pivoted downward from the stadium position as the pinions travel rearward along the curved portions of the racks; and
the cushion frame is translated rearward towards the seating position as the pinions travel rearward along the straight portions of the racks.

17. The vehicle seat as set forth in claim 1, further comprising:
a lead screw having a lower end pivotably coupled to the side members;
a threaded nut meshingly engaged with the lead screw; and
a motor assembly fixedly coupled to the cushion frame and operatively coupled to the threaded nut and configured to selectively cause the threaded nut to travel along the lead screw in a first direction and a second direction opposite the first direction;
wherein the rear attachments are pivotably and slidably coupled to the respective pivot slots and fixedly coupled to the respective cushion side members; and
wherein the pivot slots include a straight portion and a curved portion.

18. The vehicle seat as set forth in claim 17, wherein:
the rear attachments slide along the pivot slots in a forward direction in response to the motor assembly causing the threaded nut to travel along the lead screw in the first direction; and
the rear attachments slide along the pivot slots in a rearward direction in response to the motor assembly causing the threaded nut to travel along the lead screw in the second direction.

19. The vehicle seat as set forth in claim 18, wherein:
the sliding slots slide along the front attachments causing the cushion frame to be translated as the rear attachments slide along the straight portion of the pivot slots.

20. The vehicle seat as set forth in claim 19, wherein:
the cushion frame pivots around the front attachments after the front attachments frictionally engage a forward end of the sliding slots as the rear attachments slide along the curved portion of the pivot slots.

21. The vehicle seat as set forth in claim 20, wherein:
the lead screw includes an upper end that is free floating.

* * * * *